(12) United States Patent
Gaiser

(10) Patent No.: US 10,815,857 B2
(45) Date of Patent: Oct. 27, 2020

(54) MIXING DEVICE

(71) Applicant: Eberspächer Exhaust Technology GmbH & Co. KG, Neunkirchen (DE)

(72) Inventor: Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 18 days.

(21) Appl. No.: 16/161,775

(22) Filed: Oct. 16, 2018

(65) Prior Publication Data
US 2019/0112962 A1 Apr. 18, 2019

(30) Foreign Application Priority Data
Oct. 18, 2017 (DE) .................. 10 2017 124 276

(51) Int. Cl.
*F01N 3/28* (2006.01)
*F01N 13/14* (2010.01)
*F01N 3/20* (2006.01)
*B01F 15/06* (2006.01)
*H05B 1/02* (2006.01)

(52) U.S. Cl.
CPC .......... *F01N 3/2892* (2013.01); *B01F 15/065* (2013.01); *F01N 3/208* (2013.01); *F01N 3/2066* (2013.01); *F01N 13/141* (2013.01); *H05B 1/0236* (2013.01); *H05B 1/0297* (2013.01); *B01F 2015/062* (2013.01); *F01N 2240/12* (2013.01); *F01N 2240/16* (2013.01); *F01N 2240/25* (2013.01); *F01N 2470/24* (2013.01); *F01N 2610/02* (2013.01); *F01N 2610/102* (2013.01); *H05B 2203/02* (2013.01)

(58) Field of Classification Search
CPC combination set(s) only.
See application file for complete search history.

(56) References Cited

U.S. PATENT DOCUMENTS

| 8,407,990 | B2* | 4/2013 | Bruck | B01B 1/005 60/295 |
|---|---|---|---|---|
| 9,062,582 | B2* | 6/2015 | Loman | F01N 3/206 |
| 9,086,005 | B2* | 7/2015 | Omote | F01N 3/2066 |
| 9,375,682 | B2* | 6/2016 | Maus | F01N 3/208 |

(Continued)

FOREIGN PATENT DOCUMENTS

| CN | 203856551 U | 10/2014 |
|---|---|---|
| CN | 104948270 A | 9/2015 |

(Continued)

*Primary Examiner* — Binh Q Tran
(74) *Attorney, Agent, or Firm* — McGlew and Tuttle, P.C.

(57) ABSTRACT

A mixing device for an exhaust system of an internal combustion engine includes a mixing section (14) with a mixing section inlet area (20) to be positioned downstream in relation to a reactant introduction device (12). A mixing section outlet area (22) is positioned upstream in relation to a catalytic converter device (16). The mixing section (14) includes an inner wall (26) surrounding an inner volume (28), through which exhaust gas (A) or/and reactant (R) can flow, and an outer wall (24) surrounding the inner wall (26). An outer volume (30) surrounds the inner volume (28) in a ring-shape, formed between the inner wall and the outer wall (24). An electrically energizable heating device (34) is provided at the inner wall (26), or/and a heat transfer rib formation (54) is provided at the inner wall (26).

30 Claims, 5 Drawing Sheets

(56) References Cited

U.S. PATENT DOCUMENTS

| | | | |
|---|---|---|---|
| 10,519,834 B2 * | 12/2019 | Saiki | B01D 53/9431 |
| 2008/0134671 A1 | 6/2008 | Nefischer | |
| 2015/0267596 A1 * | 9/2015 | Tobben | F01N 3/0253 |
| | | | 60/274 |

FOREIGN PATENT DOCUMENTS

| | | |
|---|---|---|
| DE | 102 01 044 A1 | 9/2003 |
| DE | 10 2004 004 738 A1 | 8/2005 |
| DE | 10 2006 023 145 A1 | 11/2007 |
| DE | 10 2014 205 156 A1 | 9/2015 |
| DE | 10 2014 017961 A1 | 6/2016 |
| DE | 10 2017 204449 A1 | 10/2017 |
| EP | 1 936 137 A1 | 6/2008 |
| EP | 3 141 719 A1 | 3/2017 |
| WO | 2005/103459 A1 | 11/2005 |

\* cited by examiner

MIXING DEVICE

CROSS REFERENCE TO RELATED APPLICATIONS

This application claims the benefit of priority under 35 U.S.C. § 119 of German Application 10 2017 124 276.7, filed Oct. 18, 2017, the entire contents of which are incorporated herein by reference.

FIELD

The present invention pertains to a mixing device for an exhaust system of an internal combustion engine, comprising a mixing section with a mixing section inlet area to be positioned downstream in relation to a reactant introduction device and with a mixing section outlet area to be positioned upstream in relation to a catalytic converter device.

BACKGROUND

An exhaust system for an internal combustion engine, in which a tubular inner wall is surrounded by a likewise tubular outer wall in a longitudinal section of the exhaust system, is known from DE 102 01 044 A1. The inner wall surrounds an inner volume, through which exhaust gas can flow. An outer volume, through which exhaust gas can likewise flow, is formed between the inner wall and the outer wall. A swirl generator is provided upstream in relation to the inner wall and the outer volume formed between the inner wall and the outer wall. The swirl generator imparts a circumferential direction component to the exhaust gas flowing in essentially linearly from the upstream direction. Depending on the flow velocity of the exhaust gas flowing towards the swirl generator, the exhaust gas stream is guided such that it flows essentially completely through the inner volume at a comparatively low flow velocity, it flows essentially completely through the outer volume at a very high flow velocity, and the exhaust gas stream is split between the inner volume and the outer volume in a middle flow area. To achieve this, the swirl generator has guide blades, which are set at an angle, for example, in relation to the flow direction of the exhaust gas flowing towards the swirl generator and are arranged in a ring-shaped formation.

To reduce the pollutant emission of internal combustion engines, especially diesel internal combustion engines, it is known that a reactant, for example, a urea/water solution, can be added to the exhaust gas. The reactant is mixed with the exhaust gas in a mixing section, and the reactant evaporates and is thermally decomposed in the process and ammonia will essentially be formed, which reacts in an SCR (selective catalytic reduction) catalytic converter device positioned downstream, in a catalytic reaction to reduce the percentage of harmful nitrogen oxide. There is a risk, above all, at comparatively low operating and ambient temperatures and high metering rates of the reactant, that the reactant will not be mixed efficiently with the exhaust gas and will not be decomposed, so that ammonia necessary for the selective catalytic reduction will not be provided efficiently.

SUMMARY OF THE INVENTION

An object of the present invention is to provide a mixing device for an exhaust system of an internal combustion engine, which guarantees efficient mixing of reactant and exhaust gas as well as efficient decomposition of the reactant.

This object is accomplished according to the present invention by a mixing device for an exhaust system of an internal combustion engine, comprising a mixing section with a mixing section inlet area to be positioned downstream in relation to a reactant introduction device and with a mixing section outlet area to be positioned upstream in relation to a catalytic converter device, wherein the mixing section comprises an inner wall surrounding an inner volume, through which exhaust gas or/and reactant can flow, wherein an outer volume surrounding the inner volume in a ring-shaped manner is formed between the inner wall and the outer wall, wherein an electrically energizable heating device is provided at the inner wall, or/and a heat transfer rib formation is provided at the inner wall.

The present invention provides for actions that ensure that improved thermal conditions can be provided for the evaporation and the decomposition of the reactant added to the exhaust gas. On the one hand, an electrically energizable heating device can be used for this, which is operated above all when the exhaust gas or/and exhaust gas-carrying components of an exhaust system have comparatively low temperatures in order to provide especially a sufficient amount of thermal energy in such an operating state for the evaporation and the thermal decomposition of the reactant. If the exhaust gas is transporting a sufficient amount of heat or the exhaust gas-carrying components are sufficiently heated by the exhaust gas stream, the provision of a heat transfer rib formation and the enlarged interaction surface thus provided for heating the reactant can likewise contribute to an improved introduction of heat into the exhaust gas and into the reactant.

To make it possible to actively introduce heat into the mixing device in a simple manner, it is proposed that the electrically energizable heating device comprise at least one heating element heatable by electrical energization. Such a heating element may be provided, for example, as a heating coil, heating conductor, strip heater or heating cuff and may be made primarily from a metallic material, ceramic material or semiconductor material.

If, for example, at least one heating element is provided on an outer side of the inner wall, the exhaust gas stream being guided along the inner side of the inner wall is not compromised by such a heating element.

The provision of at least one heating element on an inner side of the inner wall can ensure that heat is introduced into the inner wall especially where a primary thermal interaction will take place with the reactant. Further, a heat loss to the outside via the outer wall is avoided in this manner to the greatest extent possible.

Provisions may be made in an embodiment that can be embodied in a simple manner for at least one heating element to comprise a heating conductor (winding) surrounding a central longitudinal axis of the inner wall in a winding manner.

If the heat demand is nearly constant over essentially the entire length of the mixing section, it is proposed that the pitch of the windings of the heating conductor in the direction of the central longitudinal axis of the inner wall be essentially constant at least in some areas.

If the heat demand varies over the length of the mixing section, the pitch of the windings of the heating conductor may vary in the direction of the central longitudinal axis. For example, the pitch of the windings of the heating conductor may preferably increase essentially continuously in a main flow direction in such a configuration in at least one longitudinal area of the inner wall.

In another type of configuration, at least one heating element may comprise a heating conductor wound in a meandering manner.

It is proposed according to the present invention, for a very uniform introduction of heat into the inner wall, that at least one heating element comprise a sheet-type (sheet configuration) heating element covering at least 50% and preferably at least 80%, of an outer surface of the inner wall, or/and that at least one heating element comprise a sheet-type heating element covering at least 50% and preferably at least 80% of an inner surface of the inner wall.

It is proposed in one embodiment, which can be embodied with a simple configuration and which converts the introduced energy efficiently into heat, that the inner wall be electrically conductive and form a heating element.

To ensure in such an embodiment that the entire inner wall contributes essentially uniformly to the electrical conduction and hence also to the heating, provisions may be made for contacting areas to be formed, which preferably extend over the entire circumference of the inner wall at longitudinal edge areas of the inner wall, or for contacting areas preferably extending over the entire longitudinal extension of the inner wall to be formed at longitudinal edge areas of the inner wall interrupted in a circumferential area. Such contacting areas may be provided, for example, by areas of thickened material, i.e., by a greater material thickness compared to other areas of the inner wall.

At least one heating element may be a PTC (positive thermal coefficient of resistance) heating element. The resistance characteristic of such a PTC heating element, which has a markedly greater increase in one temperature range and this leads to a self-limitation of the electric current flowing through such a heating element, is utilized in an especially advantageous manner. It can thus be achieved, for example, that the temperature of the actively heated inner wall will become established in a temperature range of about 300° C., without having to carry out a temperature regulation. For example, barium titanate may be used for this as the material for such a PTC heating element.

When the outer volume is closed against the flow of exhaust gas or/and reactant, this outer volume forms essentially an insulation gap, which shall keep heat losses to the outside as low as possible.

If exhaust gas or/and reactant can flow through the outer volume, this volume can also be used for heat transfer to the exhaust gas or reactant which flows around the inner wall on the outer side thereof.

It is especially advantageous in this connection if the heat transfer rib formation comprises a plurality of heat transfer ribs arranged following one another in the circumferential direction on the outer side of the inner pipe.

The heat transfer ribs may have, for example, a plate-like configuration (plate configuration) or/and may be arranged extending radially outwardly essentially from the outer side of the inner wall in relation to the central longitudinal axis of the inner wall.

In an alternative embodiment, a comparatively large heat transfer surface can be provided by the heat transfer ribs being arranged such that they surround the inner wall on the outer side thereof in a wave-like manner (a wave shape).

An especially efficient thermal interaction of the exhaust gas or of the reactant with the heat transfer rib formation can be achieved by providing a plurality of groups of heat transfer ribs arranged following one another in the direction of the central longitudinal axis of the inner wall, wherein the heat transfer ribs of groups following each other directly are offset in relation to one another in the circumferential direction or/and the heat transfer ribs have different circumferential distances from one another in groups following each other directly, so that the boundary layer interacting thermally with the surface of the heat transfer ribs is steadily renewed in the transition of the groups following each other in the flow direction.

To make it possible, on the one hand, to provide a large surface, and to hinder, on the other hand, the exhaust gas stream in the mixing section as little as possible, it is proposed that the heat transfer ribs have heat transfer surfaces extending essentially in the direction of the central longitudinal axis of the inner wall.

The heat transfer rib formation can at the same time be used to hold the inner wall in the outer wall when the heat transfer ribs are in contact with an inner side of the outer wall radially on the outside. At least one part of the heat transfer ribs preferably has, radially on the outside, support areas defined axially in the direction of the central longitudinal axis of the inner wall for support in relation to the outer wall, so that an excessive heat transfer to the outer wall is avoided.

The outer wall or/and the inner wall may have a tubular configuration.

The present invention further pertains to an exhaust system for an internal combustion engine, comprising a reactant release device, an SCR catalytic converter device downstream of the reactant release device, and a mixing device configured according to the present invention between the reactant release device and the SCR catalytic converter device.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
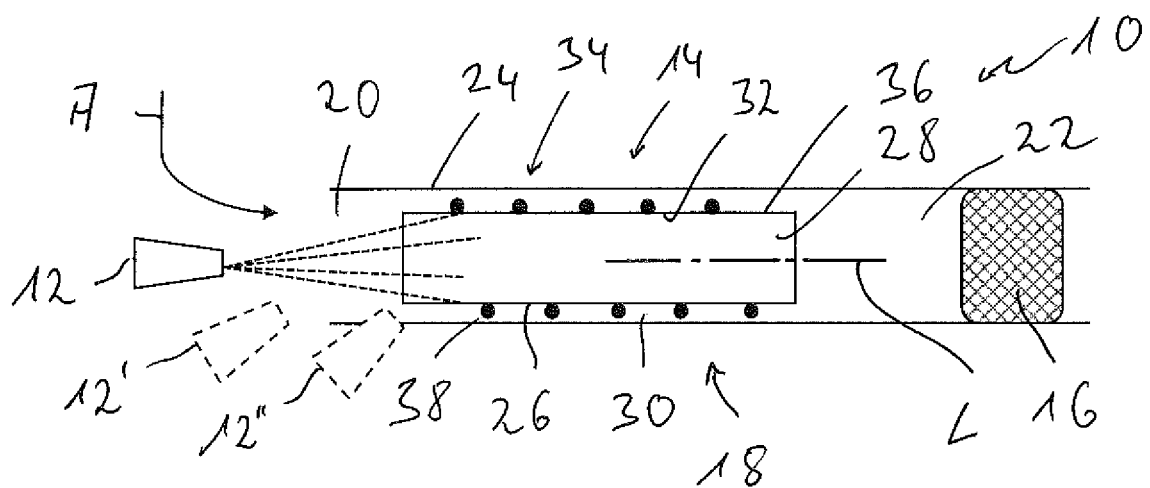
FIG. 1 is a schematic view of a part of an exhaust system with a mixing section.

Referring to the drawings, FIG. 1 shows in a schematic view a part of an exhaust system of an internal combustion engine, especially in a vehicle, which said exhaust system is generally designated by 10. The exhaust system 10 comprises a reactant release device 12, through which a reactant, for example, a urea/water solution, is added to the exhaust gas A flowing in from a location located farther upstream. A mixing device 14, in which the reactant R is mixed with the exhaust gas A, is provided downstream of the reactant release device 12, which is generally also called injector. The water contained in the reactant R shall be evaporated in the process, and the urea shall be thermally decomposed, so that ammonia and generally also isocyanic acid are formed, which latter can be catalytically decomposed with the evaporated water to more ammonia in a thermolysis reaction. The ammonia generated from the reactant is catalytically converted in an SCR catalytic converter device 16 positioned farther downstream in order to lower the percentage of harmful nitrogen oxides in the exhaust gas stream.

FIG. 1 shows that the reactant release device 12 may be positioned in different positions. As is indicated by the solid line, it may be arranged such that the reactant R is injected as a spray cone essentially in a longitudinal extension direction of the mixing device 14 or of a mixing section 18 thereof. As an alternative, oblique injection is possible, as it is illustrated, for example, by the devices 12' and 12" indicated by broken lines.

The mixing section 18 located in the flow direction between the reactant release device 12 and the SCR catalytic converter device 16 has a mixing section inlet area 20 following the reactant release device 12 and a mixing section outlet area 22 located essentially upstream of the SCR catalytic converter device in the flow direction. The mixing device 14 configured according to the present invention and the mixing section 18 thereof have a double-walled configuration between the mixing section inlet area 20 and the mixing section outlet area 22. The mixing section 18 comprises in this area an outer wall 24 configured, for example, as a pipe or having a tubular configuration, as well as an inner wall 26 likewise configured as a pipe or having a tubular configuration. The outer wall 24 and the inner wall 26 may have, for example, an essentially cylindrical configuration and have, for example, an essentially circular cross section.

The inner wall 26 surrounds an inner volume 28. An outer volume 30 surrounding the inner volume 28 in a ring-shaped manner is formed between the inner wall 26 and the outer wall 24. The mixing section 18 is configured in the exemplary embodiment shown in FIG. 1 such that exhaust gas A and reactant R can flow through both the inner volume 28 and the outer volume 30. Provisions are, however, preferably made in this connection for the reactant release device 12 to be positioned and to release the reactant R such that the reactant wets essentially an inner side 32 of the inner wall 26, i.e., it reaches the inner side 32 of the inner wall essentially in the form of a spray cone during release.

The mixing device 14 further comprises an electrically energizable heating device 34. In the exemplary embodiment shown in FIG. 1, the electrically energizable heating device 34 comprises a heating element 38, for example, in the form of a heating conductor, which is positioned on an outer side 36 of the inner wall 26 and surrounds the inner wall 26 in a helical manner (in a helical configuration) with essentially constant pitch. The heating element 38 may be configured, in particular, as a jacket heating conductor, which has a metallic jacket to be attached to the inner wall 26, for example, by soldering, and a heating wire arranged thereon in an insulated manner. During electrical energization, the heating element 38 heats the inner wall 26, so that the reactant R reaching the inner wall 26 can absorb heat. Since a part of the exhaust gas A entering the mixing section 18 at the mixing section inlet area 30 flows along the outer side 36 of the inner pipe 26, i.e., through the outer volume 30, this part of the exhaust gas A can also transfer heat to the inner volume 28 via the inner pipe 26.

It is guaranteed by the association of the heating device 34 with the inner pipe 26 that essentially the total amount of the heating energy provided by the heating device 34 is introduced into the inner pipe 26 and via this into the exhaust gas A and the reactant R. A heat loss via the outer wall 24 can be avoided to the greatest extent possible. Furthermore, the surface available for absorbing heat from the exhaust gas A is markedly enlarged due to the flow around both sides of the inner pipe 26, so that sufficient transfer of thermal energy to the reactant R wetting the inner pipe 26 is also guaranteed especially during a phase of the operation during which the exhaust gas A is already transporting a sufficient amount of heat and energization of the heating device 34 is consequently unnecessary. Provisions may be made for this, for example, for the percentage of the exhaust gas A flowing through the outer volume 30 to be in the range of 20% to 30% of the total stream, so that the majority of the exhaust gas A, i.e., about 70% to 80%, flows through the inner volume 28. Since the inner pipe 26 is arranged essentially parallel to the outer pipe 24, a substantial deterioration of the exhaust gas stream is avoided.

A swirl generator, which was explained above in reference to the state of the art and which ensures that the percentage of the exhaust gas flowing through the outer volume 30 varies, especially increases depending on the flow velocity and hence also depending on the state of load of an internal combustion engine discharging the exhaust gas A, could be provided in the mixing section inlet area 20.

Figure 2:
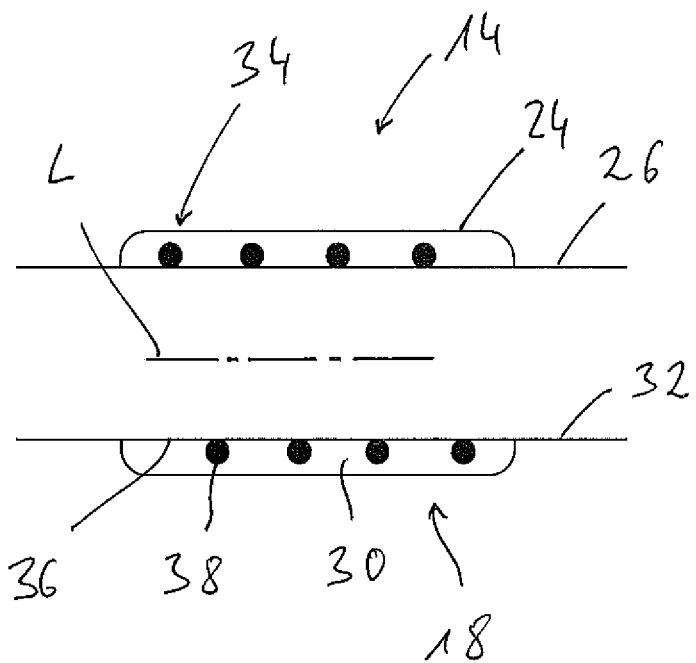
FIG. 2 is a schematic view of a mixing section having an alternative configuration.

An alternative embodiment is shown in FIG. 2. The inner wall 26 is surrounded by the heating element 38 of the heating device on the outer side 36 thereof in this embodiment as well. The outer volume 30 formed between the inner pipe 26 and the outer pipe 24 is, however, configured such that exhaust gas cannot flow through it. The outer volume 30 thus forms essentially an insulating gap, which shall prevent heat losses to the outside to the greatest extent possible. The heating device 34 may be used in this embodiment as well to guarantee sufficient evaporation and decomposition of the reactant R by the active heating, i.e., the introduction of thermal energy via the heating device 34, especially in operating states in which the exhaust gas-carrying components, e.g., the inner pipe 26 and the outer pipe 24, are comparatively cold or the process is being carried out at high metering rates of the reactant R.

Different configurations of the heating device 34 will be described below with reference to FIGS. 3 through 7.

Figure 3:
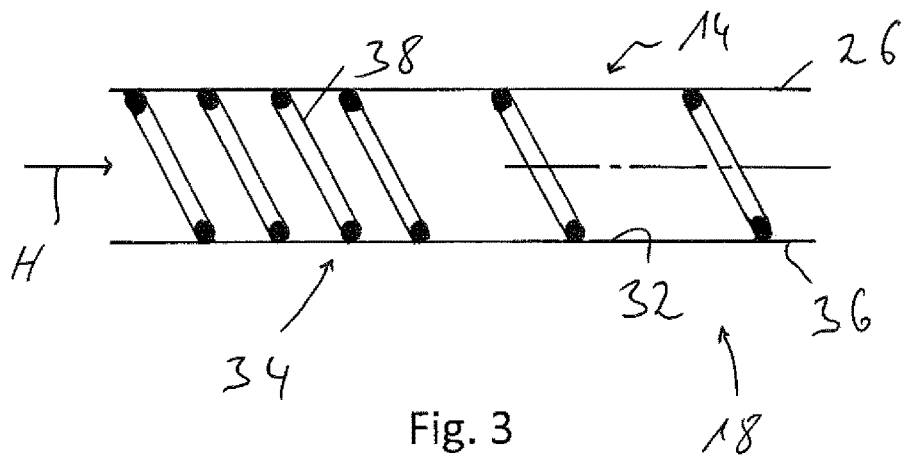
FIG. 3 is an inner wall of a mixing section with a heating element of a heating device, which heating element is provided on an inner side of said inner wall.

FIG. 3 shows an embodiment, in which the heating element 38 of the heating device 34, which heating element is again provided as a helical heating conductor, is provided on the inner side 32 of the inner wall 26 and is fixed thereon, for example, by connection in substance, e.g., by soldering.

The heating element 38 is thus also exposed markedly more intensely to the exhaust gas A and the reactant R, which may lead to an increased heat transfer. The arrangement of the helically wound heating element 38 on the inner side 32 of the inner wall 26 has, furthermore, the advantage that the reactant R reaching primarily the inner side 32 is conveyed during its motion brought about by the exhaust gas stream along the inner side 32 of the inner wall 26 on a correspondingly helical path predefined by the individual turns of the heating element 38, so that the section over which interaction takes place with the inner side 32 of the inner wall 26 is markedly enlarged.

It can also be seen in FIG. 3 that the pitch of the windings of the heating element 38 may vary. While the pitch is constant over a longitudinal area in the left-hand part of the inner wall 26, it is increased to the right, so that the distance between the individual windings increases correspondingly. It becomes possible in this manner to also guarantee the introduction of a larger amount of heat by a greater winding density where the introduction of a larger amount of heat is advantageous, for example, because of the arrival of a comparatively large quantity of reactant R. Based on the lower winding density and the higher pitch, only a reduced amount of heat is also introduced into the inner wall 26 in the part located farther downstream in a main flow direction H, which may correspond essentially to a direction in which the central longitudinal axis L of the inner wall 26 extends. It becomes possible in this manner to adapt the introduction of heat such that a larger amount of heat is, indeed, introduced in the areas in which the introduction of a larger amount of heat is advantageous, by selecting a correspondingly smaller pitch and hence a greater winding density.

It should be noted that this can, of course, also be achieved if the heating element 38, as it is shown in FIGS. 1 and 2, is arranged on the outer side 36 of the inner wall 26, regardless of whether exhaust gas and reactant can flow through the outer volume 30 or not.

Figure 4:
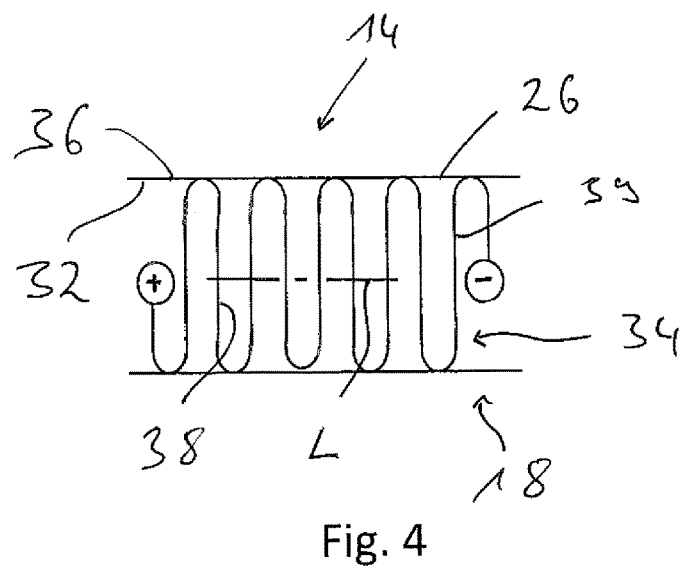
FIG. 4 is an inner wall of a mixing section with a heating element of a heating device, which heating element is provided on the inner wall.

An alternative embodiment is shown in FIG. 4. This shows a heating element 38, which is again configured, for example, as a jacket heating element, and which is configured with an essentially meandering structure extending to and fro in a circumferential direction on the inner wall 26. The heating element 38 may be arranged on the inner side 32, but preferably on the outer side 36 of the inner wall in this configuration.

Figure 5:
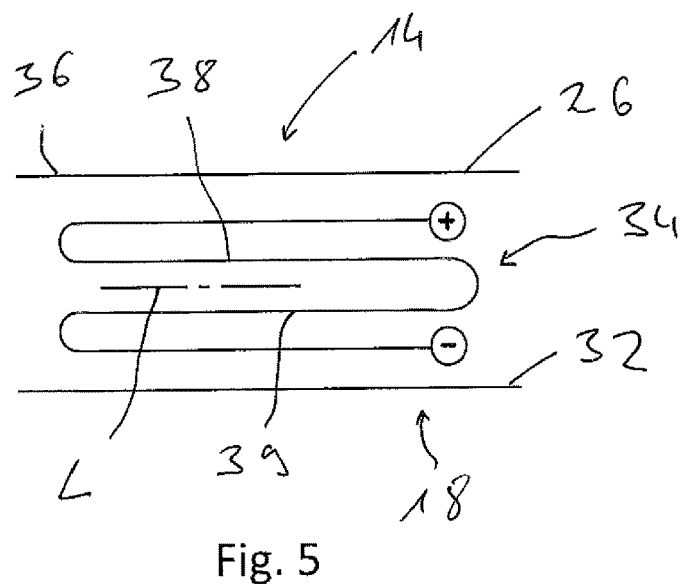
FIG. 5 is an inner wall of a mixing section with a heating element of a heating device, which said heating element is provided on the inner wall.

A corresponding configuration is shown in FIG. 5. The heating element 38 arranged with a meandering structure is positioned here such that it is configured essentially such that it extends meandering to and fro in the direction of the central longitudinal axis L of the inner wall 26.

It is also possible in a simple manner in the arrangements shown in FIGS. 4 and 5 to correspondingly vary the amount of heat introduced into the inner wall 26 by correspondingly varying the mutual distance between the meandering sections 39 of the respective heating element 38 or by a varying distance, i.e., to provide a greater density of meandering sections 39 in areas in which the introduction of a larger amount of heat is advantageous than in other areas.

Figure 6:
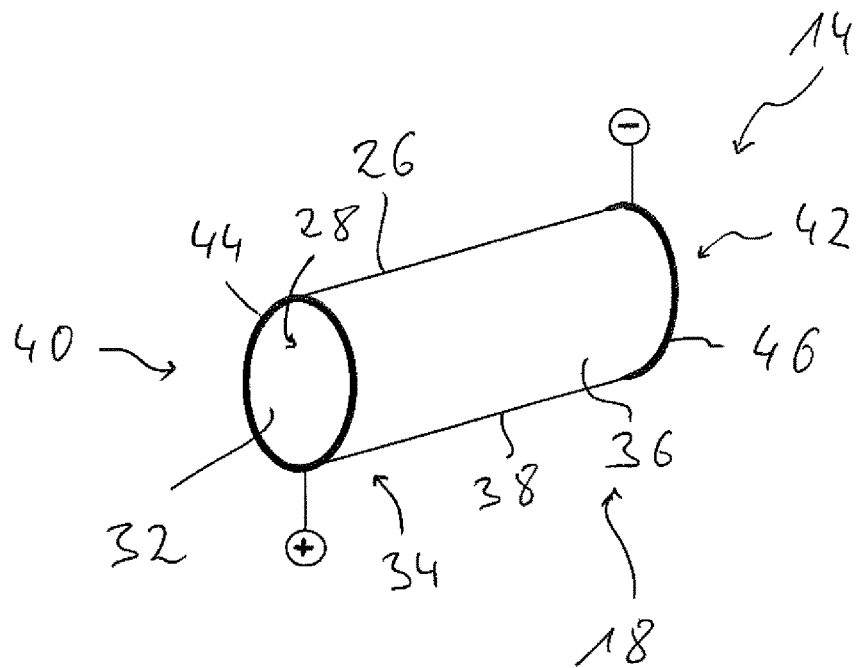
FIG. 6 is an inner wall of a mixing section with a heating element of a heating device, which said heating element is provided on the inner wall.

Another alternative embodiment of a heating device 34 is shown in FIG. 6. The inner wall 26 itself forms a heating element 38 of the heating device 34 in this type of configuration of the heating device 34. The inner wall 26 is made, in general, of an electrically conductive material, i.e., for example, a sheet metal material. Contacting areas 44, 46, in which the inner wall 26 is electrically contacted, are formed at the two longitudinal end areas 40, 42 of the inner wall 26. To guarantee uniform current conduction or heating over the circumference of the inner wall 26, the contacting areas 44, 46 may be provided, for example, by areas of thickened material, so that a preferred current conduction takes place in these contacting areas 44, 46 in the circumferential direction and then between the contacting areas 44, 46. The increase in the material thickness may be provided, for example, by applying additional material in the contacting areas 44, 46.

Figure 7:
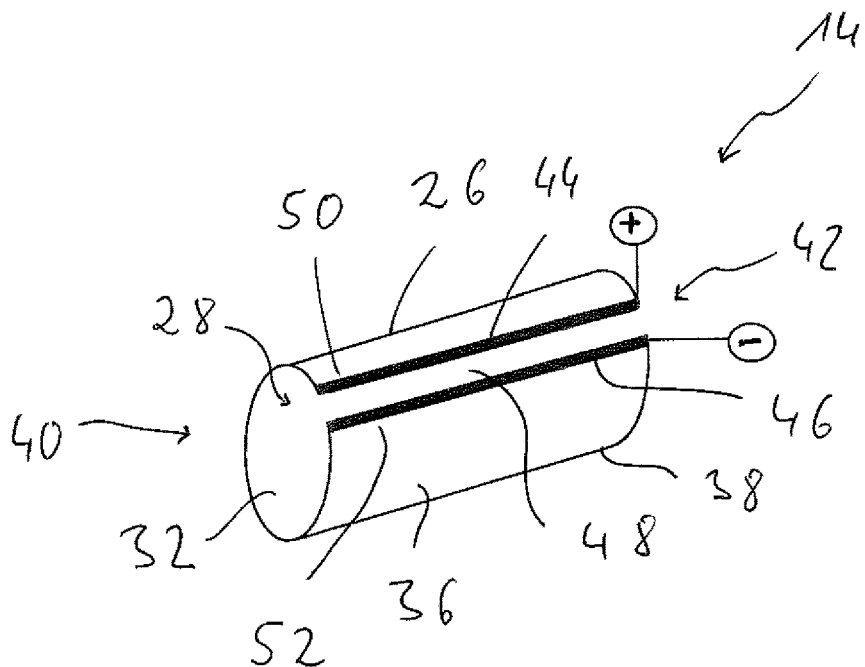
FIG. 7 is an inner wall of a mixing section with a heating element of a heating device, which said heating element is provided on the inner wall.

The essentially tubular inner wall 26 is interrupted in a circumferential area 47 and has longitudinal edge areas 50, 52 located opposite each other in this area in the type of configuration shown in FIG. 7. The contacting areas 44, 46 are provided, for example, by increasing the material thickness at these longitudinal edge areas 50, 52, which extend, for example, essentially in the direction of the central longitudinal axis L of the inner wall 26, so that current conduction that is essentially uniform over the entire length of the inner wall 26 and hence correspondingly an essentially uniform heating can be guaranteed. The type of configuration of the inner wall 26 providing a heating element 38, which configuration is shown in FIG. 7, may be used in an especially advantageous manner in conjunction with the arrangement of the reactant release device, which arrangement is designated by reference number 12" in FIG. 1. The reactant release device 12" and the inner wall 26 may be positioned in relation to one another such that the reactant R can be injected by the reactant release device 12" into the inner volume 28 in the circumferential area 48 through the gap formed there.

The embodiment of the heating device 34 with an essentially flat heating element, which latter is provided, for example, by the inner wall 26, is especially advantageous because the electrical resistance will also decrease correspondingly and a preferred current conduction will thus take place in these areas in the surface areas in which more intense cooling takes place due to an intensified interaction with the reactant R reaching these surface areas, as a consequence of which a correspondingly more intense heating will develop in these areas subjected to a higher thermal load. A corresponding effect may also be provided, for example, by a heating element having a flat configuration being applied to the surface of an inner wall 26, which does not act, in principle, as a heating element itself, preferably via the intermediary of an electrically insulating layer. Such a surface coating with an electrically conductive material, for example, a PTC material, which thus forms a heating element, may cover, for example, at least 50% and preferably at least 80% of the surface of the inner wall 26 on the inner side thereof or/and also cover same on the outer side thereof.

Configurations of the mixing device 14, in which intensified heat transfer takes place to the inner wall 26 or an intensified thermal interaction takes place between the inner wall 26 and the reactant R due to an enlargement of the surface of the inner wall 26, will be explained below with reference to FIGS. 8 through 10. It should be noted that the aspects explained below may be embodied technically independently, but they may, of course, also be compressed in combination with the above-described aspects, which pertain to the provision of an electrically energizable heating device.

Figure 8:
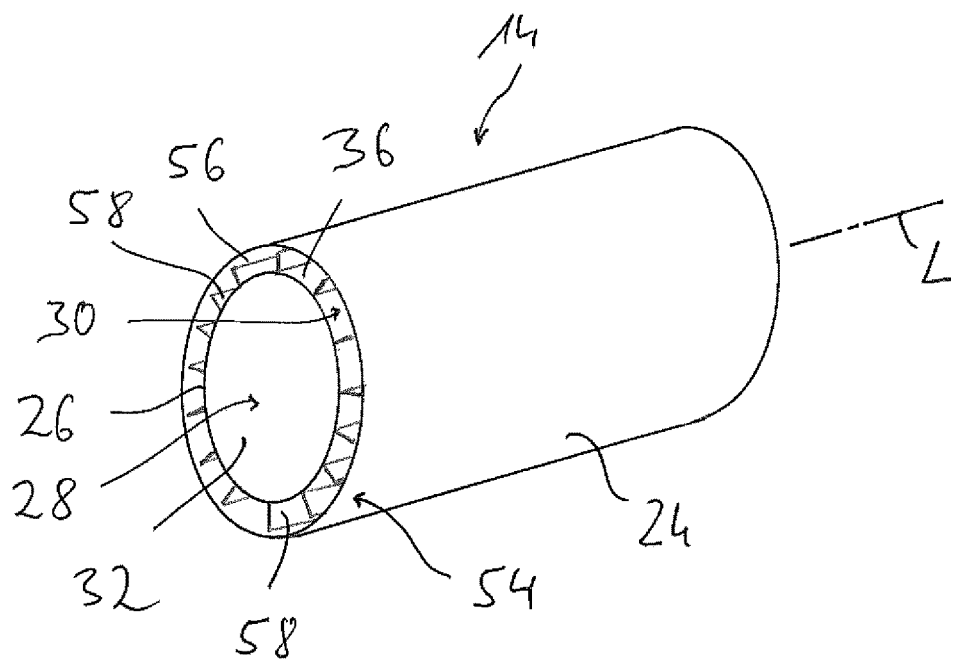
FIG. 8 is a mixing section with a heat transfer rib formation provided on an inner wall.

The mixing device 14 shown in FIG. 8 is configured with the inner wall 26 and the outer wall 24 surrounding same. A heat transfer rib formation 54 with a plurality of heat transfer ribs 56, which project essentially radially outwardly from the inner wall 26 on the outer side and extend in the direction of the central longitudinal axis L of the inner wall 26, is provided on the outer side 36 of the inner wall 26. The heat transfer ribs 56 thus extend essentially in the outer volume 30, through which exhaust gas can flow. The exhaust gas A flowing in the outer volume 30 transfers heat in the process to the heat transfer ribs 56, around which it flows. The heat being transported in the exhaust gas A flowing in the outer volume 30 can thus also be used to support an improved evaporation and thermal decomposition of the reactant R reaching essentially the inner side 32 of the inner pipe 26. Since the heat transfer ribs 56 extend essentially in the direction of the central longitudinal axis L of the inner pipe 26, they do not essentially compromise the flow of exhaust gas.

Figure 9:
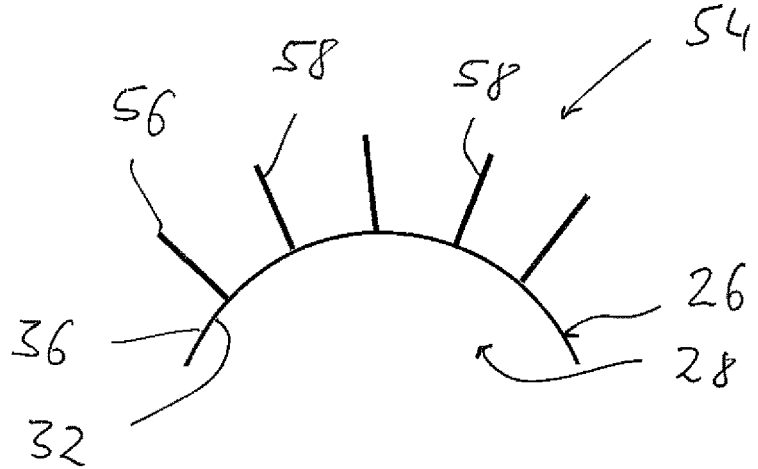
FIG. 9 is different types of configuration of heat transfer rib formations provided on an inner wall.
Figure 9:
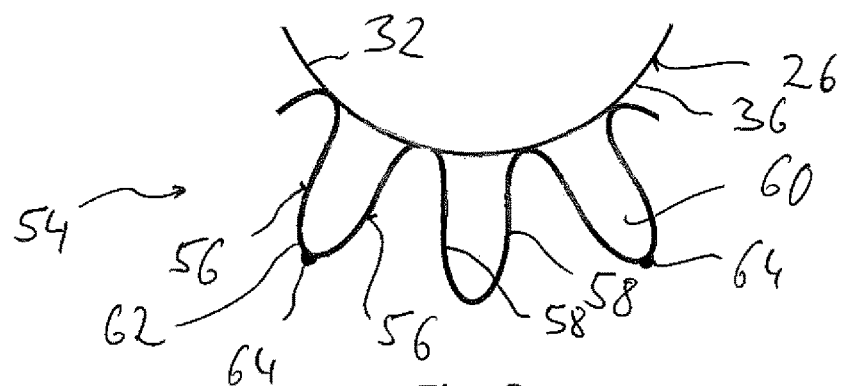

In its upper and lower parts, FIG. 9 illustrates two different configurations of the heat transfer rib formation 54. The heat transfer ribs 56 also recognizable in FIG. 8 with the heat transfer surfaces 58 formed on them on both sides can be seen in the upper part of FIG. 9. These extend, starting from the outer side 36 of the inner wall 26, essentially radially outwardly and may be dimensioned, for example, such that they do not essentially touch the outer wall 24, in order to avoid a heat transfer to the outer wall 24 to the greatest extent possible.

In the configuration shown in the lower part of FIG. 9, the heat transfer rib formation 54 is configured such that the heat transfer rib formation 54 surrounds the inner wall 26 with the inner wall heat transfer ribs 58 in an essentially wave-like manner (a wave configuration). For example, the heat transfer rib formation 54 may be formed by a heat transfer plate bent with a repeating wave form, which bent plate is bent around the inner wall 26 such a wave-like structure or meandering structure is provided. The plate is fixed on the outer side 36 of the inner wall 26 by, for example, soldering. Ducts 60, through which exhaust gas A can flow uniformly, are thus formed in the wave-like structure, so that the heat transfer rib formation 54 provided with a wave-like structure provides respective heat transfer surfaces 58 on both its inner side and its outer side.

It is further seen in the lower part of FIG. 9 that support areas 64 formed, for example, by nub-like bulges, with which the heat transfer rib formation 54 and, via this, the inner wall 26, can be supported on the outer wall 24, are provided on the heat transfer ribs 56 provided with a wave-like structure or on at least some of the heat transfer ribs 56 provided with a wave-like structure in respective vertex areas 62, in which adjacent heat transfer ribs 56 pass over into one another. For example, connection in substance, for example, by soldering, can be effected in these areas. The support areas 64 are limited not only in the circumferential direction, but also in the axial direction, i.e., they are markedly shorter than the heat transfer ribs 56, so that a heat transfer contact between the heat transfer rib formation 54 and the outer wall 24 is minimized.

Figure 10:
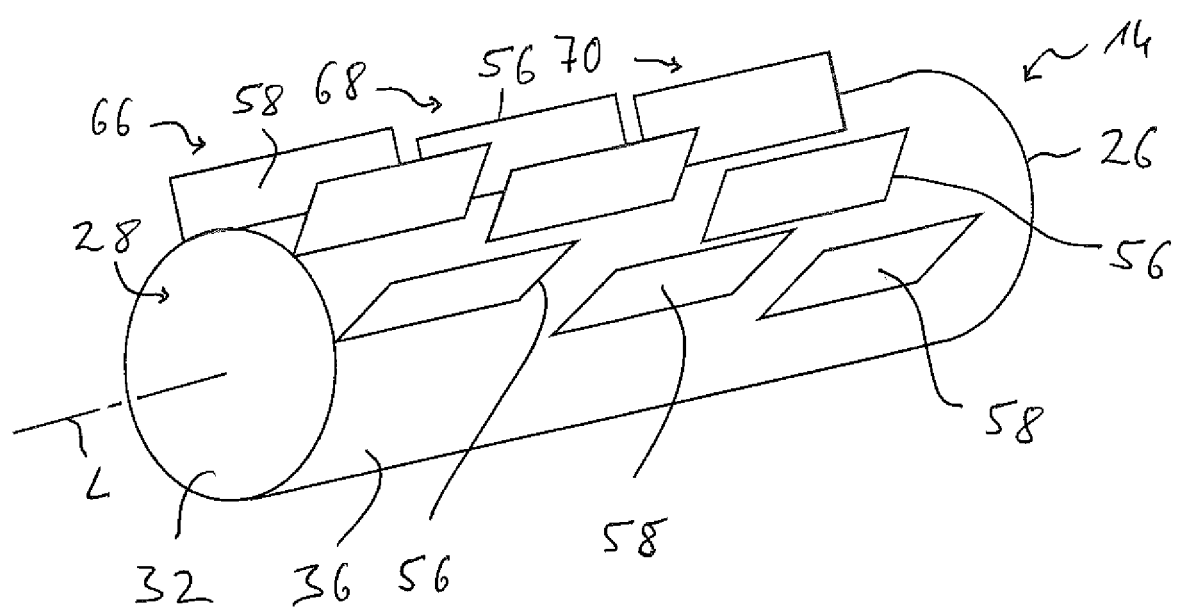
FIG. 10 is a perspective view of an inner pipe of a mixing section with groups of heat transfer ribs of a heat transfer rib formation, which groups are provided on an outer side of an inner pipe.

FIG. 10 shows an embodiment in which a plurality of groups 66, 68, 70 of heat transfer ribs 56 are arranged following each other in the circumferential direction in the direction of the central longitudinal axis L of the inner wall 26. In the individual groups 66, 68, 70, the heat transfer ribs 56 provided therein preferably have a uniform circumferential distance from respective directly adjacent heat transfer ribs 56, and, unlike as shown in FIG. 10, the heat transfer ribs 56 are provided, of course, distributed over the entire circumference in each group 66, 68, 70. The heat transfer ribs 56 of directly adjacent groups 66, 68, 70 may also have different circumferential distances from one another.

It is achieved due to the provision of such groups 66, 68, 70 of heat transfer ribs 56 that a previously present interfacial flow along a respective heat transfer surface 58 is resolved and a new interfacial flow will be formed in the next group, so that a more efficient heat transfer can be achieved. For example, the groups 66, 68, 70 following each other in the direction of the central longitudinal axis L may now be arranged such that their respective heat transfer ribs 56 do not overlap in the direction of the central longitudinal axis L, as it is shown in FIG. 10. As an alternative, the groups 66, 68, 70 could also mesh with one another in the direction of the central longitudinal axis L, i.e., they could be meshed with one another, as a result of which a higher density of the heat transfer ribs 56 provided on the outer side 36 of the inner wall 26 can be obtained. Further, the heat transfer ribs 56 may have the plate-like configuration shown in the embodiment according to FIG. 10 or they may have a wave-like structure, as it is shown, for example, in the lower part of FIG. 9.

While specific embodiments of the invention have been shown and described in detail to illustrate the application of the principles of the invention, it will be understood that the invention may be embodied otherwise without departing from such principles.

What is claimed is:

1. A mixing device for an exhaust system of an internal combustion engine, the mixing device comprising:
   a mixing section with a mixing section inlet area, to be positioned downstream in relation to a reactant introduction device, and a mixing section outlet area, to be positioned upstream in relation to a catalytic converter device, wherein the mixing section comprises an inner wall surrounding an inner volume, through which exhaust gas or/and reactant can flow, and an outer wall surrounding the inner wall to define a ring shaped outer volume, surrounding the inner volume, between the inner wall and the outer wall; and
   an electrically energizable heating device provided at the inner wall, wherein the electrically energizable heating device comprises at least one heating element heatable by electrical energization, and the at least one heating element is provided on an inner side of the inner wall.

2. A mixing device in accordance with claim 1, wherein the at least one heating element comprises a heating conductor surrounding, as a winding, a central longitudinal axis of the inner wall, at least a portion of the inner wall comprising an inner wall fluid contact surface configured to contact at least one of the exhaust gas and the reactant.

3. A mixing device in accordance with claim 2, wherein a winding pitch of the heating conductor is essentially constant in a direction of the central longitudinal axis of the inner wall in at least some areas.

4. A mixing device in accordance with claim 2, wherein the at least one heating element comprises a heating conductor with a meandering winding.

5. A mixing device in accordance with claim 2, wherein the at least one heating element is a PTC heating element, the heating element comprising a fluid contact surface configured to contact one or more of the exhaust gas and the reactant.

6. A mixing device in accordance with claim 1, wherein the outer volume is closed against flow of exhaust gas or closed against flow of reactant or closed against flow of exhaust gas and closed against flow of reactant.

7. A mixing device in accordance with claim 1, wherein the outer volume is open to flow of exhaust gas therethrough.

8. A mixing device in accordance with claim 7, wherein:
a heat transfer rib formation is provided at the inner wall; and
the heat transfer rib formation comprises a plurality of heat transfer ribs arranged following each other, in a circumferential direction, on an outer side of the inner pipe and the heat transfer ribs have a plate-shape configuration.

9. A mixing device in accordance with claim 8, wherein:
a plurality of groups of heat transfer ribs, which follow each other in a direction of the central longitudinal axis of the inner wall are provided; and
the heat transfer ribs of groups following each other directly are offset in relation to one another in the circumferential direction.

10. A mixing device in accordance with claim 7, wherein a heat transfer rib formation is provided at the inner wall and the heat transfer ribs have heat transfer surfaces extending essentially in a direction of the central longitudinal axis of the inner wall.

11. A mixing device in accordance with claim 8, wherein:
the heat transfer ribs are in contact with an inner side of the outer wall radially on the outside; and
at least one part of the heat transfer ribs has support areas defined axially radially on the outside in the direction of the central longitudinal axis of the inner wall for support in relation to the outer wall.

12. A mixing device in accordance with claim 1, wherein the outer wall has a tubular configuration.

13. An exhaust system for an internal combustion engine, the exhaust system comprising:
a reactant release device;
an SCR catalytic converter device downstream of the reactant release device; and
a mixing device comprising:
a mixing section with a mixing section inlet area, to be positioned downstream in relation to a reactant introduction device, and a mixing section outlet area, to be positioned upstream in relation to a catalytic converter device, wherein the mixing section comprises an inner wall surrounding an inner volume, through which exhaust gas or/and reactant can flow, and an outer wall surrounding the inner wall to define a ring shaped outer volume, surrounding the inner volume, between the inner wall and the outer wall; and
an electrically energizable heating device provided at the inner wall, wherein the electrically energizable heating device comprises at least one heating element heatable by electrical energization and the at least one heating element is provided on an inner side of the inner wall.

14. An exhaust system according to claim 13, wherein the at least one heating element comprises a heating conductor surrounding, as a winding, a central longitudinal axis of the inner wall.

15. An exhaust system according to claim 14, wherein a winding pitch of the heating conductor is essentially constant in a direction of the central longitudinal axis of the inner wall in at least some areas.

16. An exhaust system according to claim 13, wherein the outer volume is closed against flow of exhaust gas or closed against flow of reactant or closed against flow of exhaust gas and closed against flow of reactant.

17. An exhaust system according to claim 13, wherein the outer volume is open to flow of exhaust gas therethrough.

18. A mixing device for an exhaust system of an internal combustion engine, the mixing device comprising:
a mixing section with a mixing section inlet area, to be positioned downstream in relation to a reactant introduction device, and a mixing section outlet area, to be positioned upstream in relation to a catalytic converter device, wherein the mixing section comprises an inner wall surrounding an inner volume, through which exhaust gas and reactant flow, and an outer wall surrounding the inner wall to define a ring shaped outer volume, between the inner wall and the outer wall, and surrounding the inner volume; and
heat transfer means provided at the inner wall for transferring heat to the inner volume to affect thermal conditions for evaporation and decomposition of the reactant added to the exhaust gas in the inner volume, wherein the outer volume is open to flow of exhaust gas therethrough or open to flow of exhaust gas and reactant therethrough.

19. The mixing device in accordance with claim 2, wherein a winding pitch of the heating conductor varies in a direction of the central longitudinal axis and increases, essentially continuously, in a main flow direction in at least some areas.

20. The mixing device in accordance with claim 2, wherein a winding pitch of the heating conductor is essentially constant in a direction of the central longitudinal axis of the inner wall in at least some areas and a winding pitch of the heating conductor varies in a direction of the central longitudinal axis and increases, essentially continuously, in a main flow direction in at least some areas.

21. The mixing device in accordance with claim 1, wherein the at least one heating element comprises a sheet heating element covering at least 50% of an inner surface of the inner wall.

22. The mixing device in accordance with claim 1, wherein the outer volume is open to flow of exhaust gas and reactant therethrough.

23. The mixing device in accordance with claim 7, wherein:
a heat transfer rib formation is provided at the inner wall; and
the heat transfer rib formation comprises a plurality of heat transfer ribs arranged extending radially outwardly essentially from an outer side of the inner wall in relation to the central longitudinal axis of the inner wall.

24. The mixing device in accordance with claim 7, wherein:
a heat transfer rib formation is provided at the inner wall; and
the heat transfer rib formation comprises a plurality of heat transfer ribs arranged surrounding the inner wall on an outer side in a wave shape.

25. The mixing device in accordance with claim 8, wherein:
a plurality of groups of heat transfer ribs, which follow each other in a direction of the central longitudinal axis of the inner wall are provided; and
the heat transfer ribs of groups directly following each other have a different circumferential distance from one another.

26. The mixing device in accordance with claim 1, wherein the inner wall has a tubular configuration.

27. The mixing device in accordance with claim 1, wherein the outer wall has a tubular configuration and the inner wall has a tubular configuration.

28. The exhaust system according to claim 14, wherein a winding pitch of the heating conductor varies in a direction of the central longitudinal axis and increases, essentially continuously, in a main flow direction in at least some areas.

29. The exhaust system according to claim 14, wherein a winding pitch of the heating conductor is essentially constant in a direction of the central longitudinal axis of the inner wall in at least some areas and a winding pitch of the heating conductor varies in a direction of the central longitudinal axis an increases, essentially continuously, in a main flow direction in at least some areas.

30. The exhaust system according to claim 13, wherein the outer volume is open to flow of exhaust gas and reactant therethrough.

* * * * *